L. BELL.
LIGHT PROJECTOR.
APPLICATION FILED MAY 1, 1919. RENEWED MAR. 24, 1921.
1,435,372.
Patented Nov. 14, 1922.
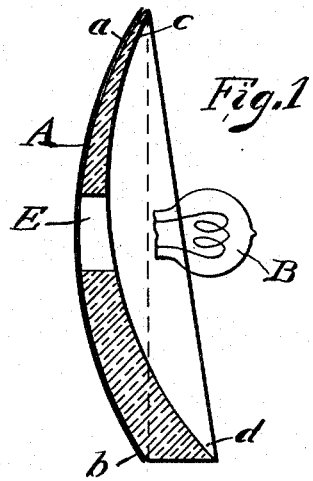
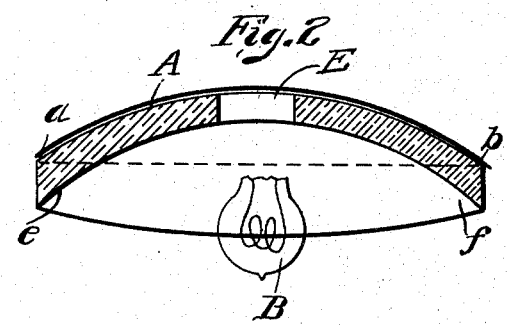
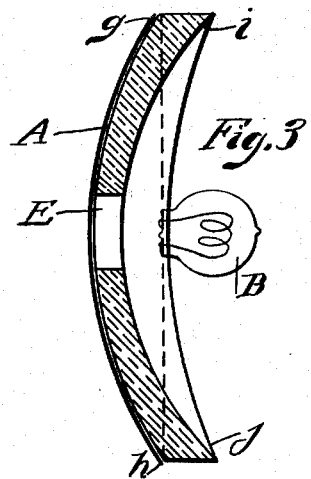
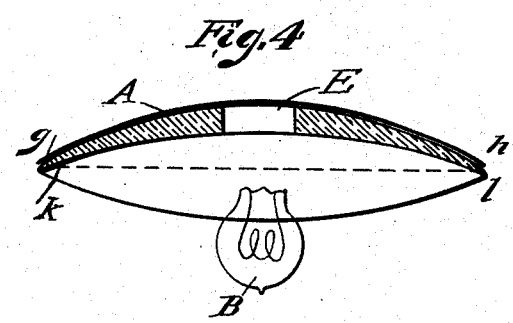
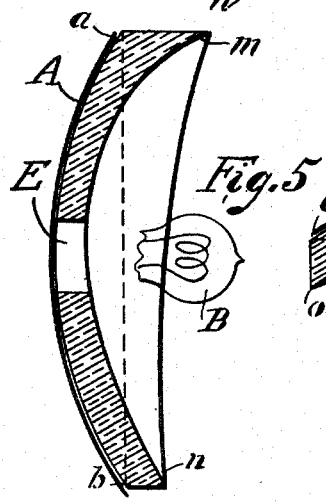
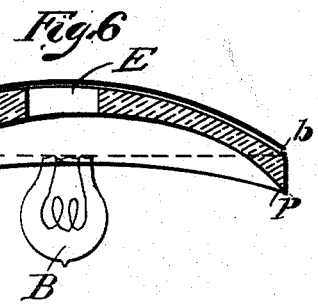
Inventor
Louis Bell
By
Attorney Patented Nov. 14, 1922.

1,435,372

UNITED STATES PATENT OFFICE.

LOUIS BELL, OF NEWTON, MASSACHUSETTS, ASSIGNOR TO EDWARD N. GODING, TRUSTEE, OF NEWTON, MASSACHUSETTS.

LIGHT PROJECTOR.

Application filed May 1, 1919, Serial No. 294,018. Renewed March 24, 1921. Serial No. 455,333.

*To all whom it may concern:*

Be it known that I, LOUIS BELL, a citizen of the United States, residing at Newton, county of Middlesex, Commonwealth of Massachusetts, have invented certain new and useful Improvements in Light Projectors, of which the following is a specification.

The subject matter of my present invention has to do with light projectors of combined reflective and refractive function. In my previous application Serial No. 277,957, filed February 19, 1919, I discussed the nature of these problems at some length and disclosed certain principles involved in that invention with embodiments illustrative thereof.

My present invention involves still further improvements of great practical advantage. In my present invention I utilize a symmetrical surface of rotation preferably spherical, as a rear or reflecting surface, combining it with a surface of refraction which may generally be defined as a surface having radii of curvature differing from the homologous coacting radii of the rear surface. By this combination I am able to produce a highly efficient control in the distribution of light in a projected beam and at the same time have the great practical advantage of manufacturing afforded by ability to press the somewhat complicated curvatures of the less sensitive refracting front and only having to polish the symmetrical curvatures of the rear surface.

As illustrative of my invention I have shown simple forms of my invention illustrating the principles involved, but slightly exaggerated for the purposes of illustration. Throughout the specification and drawings like reference numerals are employed to indicate corresponding parts, and in the drawings:

Fig. 1 shows a vertical section of a reflector illustrating one form of my invention.

Fig. 2 a transverse sectional view thereof.

Fig. 3 a similar vertical section of a modified form.

Fig. 4 a transverse sectional view of the same, and

Figs. 5 and 6 similar views of a still further modification.

In the form shown in Fig. 1 the reflector is provided with a spherical curvature of the back $a$—$b$, this curvature being obviously the same in vertical and transverse section, the back being polished and silvered at A. In the front surface in the form shown I employ a toroidal concavity which in vertical section shows a vertical curve $c$—$d$ and in a transverse section a curve $e$—$f$, the curve $c$—$d$ being of shorter radius than the curve $e$—$f$. The curve $c$—$d$ is struck from a center which lies about the center of the curve $a$—$b$. The curves $e$—$f$ and $a$—$b$ are struck from centers in the same axis but with radii of different length.

In the form shown in Figs. 3 and 4, the rear face is formed with a curvature $g$—$h$ which for the purpose of illustrating a modification may be considered as parabolic. This is combined with a front surface which in vertical section shows a curvature $i$—$j$ and in lateral section, as shown in Fig. 4, a curvature $k$—$l$. The sections as shown in Fig. 3 show coaxial curves on front and back, but of different radii. The front curve $i$—$j$ is of shorter radius. In the section shown in Fig. 4 the bounding curves are also coaxial but with the front curve $k$—$l$ of longer radius. In the form shown in Figs. 5 and 6 the front face is a toroidal surface of vertical decentering for its vertical sweep $m$—$n$ and of lateral decentering for its lateral sweep $o$—$p$. By using such unsymmetrical refracting surfaces I am able to secure a predetermined unsymmetrical distribution from a symmetrical reflecting surface. This refractive distribution is not to be confused with the symmetrically corrective function of the refraction in the Mangin mirror, but provides on the contrary a combination for predetermined unsymmetrical refractive distribution in the projected beam. These mirrors are provided with aperture E through which a source of light such as an incandescent bulb B is projected.

It is to be understood therefore that any combination in which a symmetrical reflecting surface is combined with an unsymmetrical refracting curvature or curvatures of its front is within the limits of my invention.

What I therefore claim and desire to secure by Letters Patent is:

1. A light projector of transparent material having a specularly reflecting rear surface of symmetrical curvature and a refracting front surface of toroidal form.

2. A light projector of transparent material having a specularly reflecting rear surface of spherical curvature and a refracting front surface of toroidal form.

3. A light projector of transparent material having a reflecting rear surface of revolution and a front refracting surface having radii of curvature differing in different meridians at the same radial distance from the axis of the rear surface.

4. A light projector of transparent material having a specularly reflecting curved rear surface of constant radius of curvature, and a front refracting surface having plural radii of curvature differing from the radius of the rear surface in length and plane of origin.

5. A light projector of transparent material having a specularly reflecting spherical rear surface and a front refracting surface having plural radii of curvature.

6. In a light projector, a concave glass mirror having a silvered rear constituting a surface of revolution, a source of light substantially in the corresponding axis of revolution, and a non-coaxial front surface refractively diverting light rays from said source from a distribution symmetrical about the axis of said silvered rear surface.

7. As a new article of manufacture, a light projecting mirror having a spherical mechanically polished and silvered rear surface centrally perforated, and a refracting front surface molded into a form of variant curvature axially unsymmetrical with the rear surface.

In testimony whereof I affix my signature in presence of two witnesses.

LOUIS BELL.

Witnesses:
VICTORIA LOWDEN,
MARION F. WEISS.